July 22, 1952 F. N. GILDER 2,604,110
DOMESTIC WATER SUPPLY SYSTEM
Filed Nov. 29, 1948
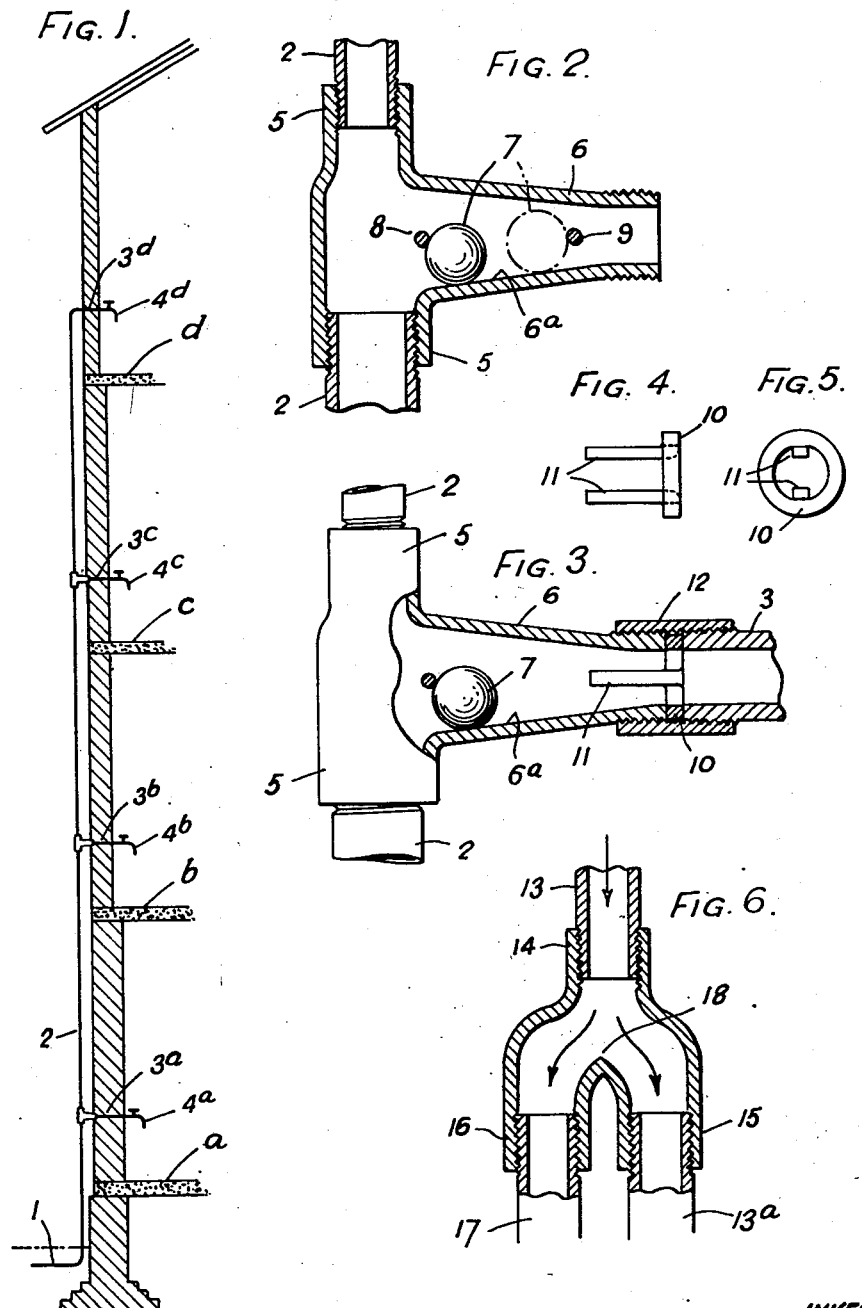
INVENTOR
FRAMROZ N. GILDER
by Wilkinson Mawhinney
Attorneys Patented July 22, 1952

2,604,110

UNITED STATES PATENT OFFICE 2,604,110

DOMESTIC WATER SUPPLY SYSTEM

Framroz Nowroji Gilder, Bombay, India

Application November 29, 1948, Serial No. 62,557
In Great Britain December 6, 1947

5 Claims. (Cl. 137—118)

This invention relates to domestic water supply systems for supplying water to the various floor levels of a building.

It is one of the objects of the invention to provide a system which includes means for automatically regulating the amount of water which may be drawn off at the various floor levels under certain conditions, so as to ensure that an equitable supply is provided at each floor level.

According to the present invention the water supply system includes a common pipe for delivering water to the various floors, and a branch pipe at each floor level connected at its inner end with the common pipe and provided at its outer end with a tap for drawing off water, each branch pipe including means adapted automatically to restrict the supply of water to its tap or cock should the pressure of water in the common pipe exceed a predetermined pressure, or the taps of the branch pipes at other floor levels be in open position.

In the case where the lower end of the common pipe is connected with a town or other main service supply adapted to deliver water to and raise it up the common pipe, valve means, for example a ball valve, is provided in each branch pipe except at the top floor which is operated by the pressure of water in the common pipe to restrict the supply through the branch pipes if the pressure in the common pipe is sufficient to raise water to a higher floor level.

A modified arrangement is provided where the water is supplied to the floors by gravity from a storage tank at or above the top floor, the modified arrangement includes a junction pipe connected with the common pipe at each floor level except the lowest floor, the junction pipe including means adapted to divide the water flowing into it so that only part thereof is delivered to the branch pipe, should a tap on a lower floor level be in open position.

To enable the invention to be fully understood it will now be described with reference to the accompanying drawing in which:

Fig. 1 shows diagrammatically a water supply system to a building wherein the wall is supplied from a town or other main service supply, Fig. 2 is a sectional view of the valve means at the branch pipes, Fig. 3 is a modification of the valve means in Fig. 2, Figs. 4 and 5 are side and end views of the modified stop shown in Fig. 3, and Fig. 6 is a section of the junction pipe provided in the common pipe at the various floor levels when the water is supplied from a storage tank at or above the top floor of the building.

In the accompanying drawings, Fig. 1 indicates diagrammatically the water supply system to a building wherein 1 indicates a service main water supply, 2 a common riser pipe for delivering water to the floor levels $a$, $b$, $c$, $d$ where it may be drawn off through branch pipes $3a$, $3d$ having a tap or cock $4a$—$4d$.

The branch pipes at the floors $a$, $b$, $c$ are connected with the common riser pipe 2 by a T joint having vertical arms 5 adapted to be screwed to sections of the pipe 2 and a branch 6 adapted to be screwed to a branch pipe 3. As shown more particularly in Figs. 2 and 3 the branch 6 has a bore which tapers inwardly from the pipe 2 with its base $6a$, sloping downwardly towards the pipe 2. A ball 7 is mounted for rolling engagement over the base $6a$ of the branch 6 and its movement is limited by a stop pin 8 at the outer end of the bore adjacent to the pipe 2 and a second stop pin 9 at the inner end of the tapered bore.

The ball valve arrangement is adapted automatically to limit the amount of water which may be drawn off at any floor level under certain supply conditions so that an equitable supply of water is assured to each floor.

The embodiment of the invention illustrated in Figs. 1 to 3 is particularly adapted for cases where the main service supply is apt to vary so that at times there may not be sufficient pressure in the mains to raise water to the upper floor levels of a building.

Assuming, for example, that the pressure in the main 1 is only sufficient to raise water in the pipe 2 to the branch $3a$ at floor level $a$, when the tap $4a$ at this floor is opened, the pressure of water flowing through the branch $3a$ will not be sufficient to move the ball 7 from the position shown in full lines in Fig. 2 and accordingly water will flow over the ball freely to the tap. Should, however, the pressure in the service main 1 be just sufficient to raise water to say the next floor level $b$, the efficient supply at this floor $b$ would be prevented if a full supply of water was still being drawn off through the tap $4a$ on the lower floor.

According to the present invention, however, should the pressure be sufficient to raise water to the higher floor level $b$, the ball 7 in the branch pipe $3a$ will automatically be moved inwardly to rest against the inner stop pin 9 to restrict the flow path in branch 6 and limit the amount of water drawn off at the lower floor $a$.

Similarly the balls at the higher floor levels b, c, will be actuated to restrict the supply to the respective floors if there is sufficient pressure to raise the water up the pipe 2 to a higher floor. Obviously a restricting ball device is not necessary at the top floor d.

Accordingly, provided there is sufficient pressure to raise water to any of the floor levels an equitable supply cannot be prevented from reaching such a floor by abuse of the occupants of lower floors attempting to draw off a full supply of water.

In the event of water not being available through temporary failure of pressure in the service main, users often leave their taps fully open either through design or inadvertence and in known supply systems, this not only may prevent higher floor levels obtaining their supply of water but also leads to waste should the occupant not be in attendance to turn off the taps immediately the supply is available. Both these drawbacks are, however, obviated by the present invention.

By reason of the sloping bottom 6a the ball automatically returns to its original position resting against the pin 8 when the tap connected with the branch pipe is turned off.

The branch connection shown in Fig. 3 is substantially the same as that shewn in Fig. 2 except that the stop 9 is replaced by a stop comprising an apertured base 10 having projecting buffer stops 11. The stop according to Fig. 3 is detachably secured by clamping the base 10 between the adjacent ends of the branch 6 and branch pipe 3 by means of a union 12. This permits the stop to be readily detachable to enable the ball 7 to be removed for inspection.

It will be noted that the ball valve restricting device is entirely automatic in action and includes no parts likely to get out of order. Further the ball by its movement keeps itself and the branch 6 in which it operates free from dirt or scale likely to hinder its efficient operation.

A modified arrangement is shewn in Fig. 6 which is adapted for use in buildings wherein the water supply to a series of floor levels is supplied from a storage tank located at the top of the building. In Fig. 6 is shewn a junction adapted to be provided at each floor level above the bottom or ground floor. As shewn in Fig. 6 13, 13a are sections of a common pipe leading from the storage tank (not shewn) to the various floors. At each of said floor levels a junction pipe is interposed between the pipe sections 13, 13a and comprises an inlet passage 14 which is screwed to the upper section 13, and twin outlets 15, 16, the outlet 15 being screwed to the adjacent lower section of the pipe 13a, and outlet 16 being screwed to a branch pipe 17 leading to a tap or cock for drawing off water at the particular floor level. The bridge portion of the junction pipe between the outlets 15, 16 is formed with a projecting wall 18 which is located off-centre of the longitudinal central axis of the upper pipe section 13 towards the outlet 16 leading to the tap at the particular floor level, thereby the projection 18 acts to deflect the major portion of the water flowing into the inlet 14 into the outlet 15 for delivery through pipe section 13a to the junction pipe at a lower floor level, the remaining portion of the water flowing into the outlet 16 for delivery to the tap at the particular floor.

In the case of the top floor of the building, assuming the taps on the lower floors are closed, pipe 13a and the outlet 15 will be filled by a static column of water and accordingly if the tap on the top floor is opened a full supply may be drawn off as all the water in pipe 13 will flow into outlet 16. Should, however, an occupant of a lower floor open a tap to draw off water, the column of water in pipe 13a will flow downwardly and the water from pipe 13 will be divided so that only a portion will flow into the outlet 16, the remaining major part flowing through the outlet 15 to the lower floors. With a deflecting junction pipe located at each floor level it will be seen that it will be impossible for an occupant to draw off all the water when some is required by the occupant of a lower floor, and consequently an equitable supply to all the floors is assured. It will be obvious that with the water supply from a storage tank at the top of a building the special deflecting junction will not be needed for the lowermost floor level, the branch pipe for this floor being directly connected with the common down pipe.

I claim:

1. In a domestic water supply system for supplying water to several floor levels of a building the provision of a common pipe up which water is raised to the various floor levels, a branch pipe at each floor level connected at its inner end with the common pipe and provided at its outer end with a tap for drawing off water, and restrictor means in the said branch pipes at each floor level except the top floor level, the said restrictor means including means which permit a substantially unrestricted flow of water through a branch pipe to its tap at any one floor level when the pressure in the said common pipe is only sufficient to raise water up the common pipe to that particular floor level but automatically limits the supply through the said branch pipe at the particular floor level when the pressure in the said common pipe is sufficient to raise water up the said common pipe to a higher floor level.

2. In a domestic water supply system for supplying water to several floor levels of a building the provision of a common pipe up which water is raised to the various floor levels, a branch pipe at each floor level connected at its inner end with the common pipe and provided at its outer end with a tap for drawing off water and a ball restrictor in said branch pipe at each floor level except the top floor level, said ball restrictor being actuated by the pressure in said common pipe automatically to restrict the flow of water through a branch pipe at any of the floor levels when the pressure in said common pipe is sufficient to raise the water up said common pipe to a higher floor level.

3. In a domestic water supply system for supplying water to several floor levels of a building the provision of a common pipe up which water is raised to the various floor levels, a branch pipe at each floor level connected at its inner end with the common pipe and provided at its outer end with a tap for drawing off water, each of said branch pipes below the top floor level having a bore of tapered cross section, a ball restrictor freely mounted in said tapered bore and displaceable inwardly of said tapered bore by the flow of water automatically to restrict the flow of water through a branch pipe at any of the floor levels when the pressure in said common pipe is sufficient to raise the water up said common pipe to a higher floor level.

4. A domestic water supply system according to claim 3 wherein spaced stops are provided in said tapered portion of said branch pipe to limit the movement of said ball.

5. In a domestic water supply system for supplying water to several floor levels of a building the provision of a common pipe up which water is raised to the various floor levels, a branch pipe at each floor level connected at its inner end with the common pipe and provided at its outer end with a tap for drawing off water, a portion of each of said branch pipes below the top floor levels having a cross section tapering from the inner to the outer end, a ball freely mounted in said tapered sections and displaceable inwardly automatically in said sections when the pressure in said common pipe exceeds a predetermined minimum pressure, a fixed stop in said tapered section for limiting the outward movement of said ball and a removable stop in said tapered section for limiting the inward movement of said ball.

FRAMROZ NOWROJI GILDER.

REFERENCES CITED

The following references are of record in the file of this patent:

UNITED STATES PATENTS

| Number | Name | Date |
|---|---|---|
| 239,284 | Weisbarth | Mar. 22, 1881 |
| 783,829 | Goodwin | Feb. 28, 1905 |
| 879,472 | Keller | Feb. 18, 1908 |
| 1,243,454 | Spaleck | Oct. 16, 1917 |
| 1,468,109 | Howard | Sept. 18, 1923 |